(12) United States Patent
Dai

(10) Patent No.: US 7,893,551 B2
(45) Date of Patent: Feb. 22, 2011

(54) HAND SQUEEZE GENERATOR

(75) Inventor: Jen Hao Dai, Jhongli (TW)

(73) Assignee: Daniel Tai IL (US)

( * ) Notice: Subject to any disclaimer, the term of this patent is extended or adjusted under 35 U.S.C. 154(b) by 409 days.

(21) Appl. No.: 12/181,384

(22) Filed: Jul. 29, 2008

(65) Prior Publication Data

US 2009/0033100 A1 Feb. 5, 2009

(30) Foreign Application Priority Data

Aug. 3, 2007 (CN) .................... 2007 2 0055199 U

(51) Int. Cl.
*F21L 13/00* (2006.01)
(52) U.S. Cl. .................................. 290/1 C; 290/1 E
(58) Field of Classification Search ............... 290/1 C, 290/1 E
See application file for complete search history.

(56) References Cited

U.S. PATENT DOCUMENTS

| 983,742 | A | * | 2/1911 | Mead | 362/192 |
| 1,015,298 | A | * | 1/1912 | Cleland | 185/39 |
| 1,131,063 | A | * | 3/1915 | Klemmer | 310/75 B |
| 1,333,119 | A | * | 3/1920 | Krag-Moller | 310/75 R |
| 1,366,461 | A | * | 1/1921 | Johnson | 362/192 |
| 2,424,700 | A | * | 7/1947 | McMath | 362/192 |
| 2,620,682 | A | * | 12/1952 | Perrot | 74/547 |
| 3,573,479 | A | * | 4/1971 | Rieth | 290/1 E |
| 5,363,445 | A | * | 11/1994 | Shyu | 379/433.11 |

FOREIGN PATENT DOCUMENTS

| CN | 200320110847 | | 1/2005 |
| GB | 2088651 | A * | 6/1982 |
| JP | 11297101 | A * | 10/1999 |
| WO | WO 9312375 | A1 * | 6/1993 |
| WO | WO 9402776 | A1 * | 2/1994 |

* cited by examiner

*Primary Examiner*—Joseph Waks
(74) *Attorney, Agent, or Firm*—Chun-Ming Shiih

(57) ABSTRACT

A hand squeeze generator includes a carrying body, a lever, an elastic member to return the crank to its original position, a gear transmission unit, and a generation motor driven by the gear transmission unit. The lever drives the gear transmission unit and the gear transmission unit drives the generation motor through a clutch gear. The hand squeeze generator may be installed on an electric appliance or connected to an electric appliance, alternatively, be used to charge a rechargeable battery. The generator is driven to generate electricity or to recharge a battery. Therefore, no external power source is required when there is no sufficient electric power supply or the battery runs down.

9 Claims, 8 Drawing Sheets

HAND SQUEEZE GENERATOR

This application is related to U.S. application Ser. No. 11/986,639 filed Jan. 2, 2008, now U.S. Pat. No. 7,723,880 issued May 25, 2010.

BACKGROUND OF THE INVENTION

1. Field of the Invention

The present invention relates to a generator, and more particularly to a hand squeeze generator.

2. Description of the Related Art

Small size electric appliances, e.g., flashlight, battery charger, are indispensable in our daily life; however, so far all these small sized electric appliances must use batteries or connection to a power source to operate. Those battery dependent products permit easy portability and convenient usage, but a battery must be replaced or recharged due to limited storage capacity of the battery. As a result, these electric appliances are not necessarily always readily available; and that could be a problem particularly for those who spend much time on the road. To correct this problem, the hand actuated generator is introduced into the market. There are two common types of hand actuated generator: one is rotated (cranking type) and the other is reciprocated (squeezing type). A rotated type of hand crank battery charger, as disclosed in China Patent No. 200320110847.2, comprises a micro generator driven by a crank to generate electricity for an output socket and an illuminating device. This design has the following shortcomings. The crank drives the generator to generate electricity through a transmission gear. The generator will stop generation of electricity when the crank stops rotation. In order to produce more electricity, the gear transmission unit needs larger transmission ratio. Even the user turns the crank quickly, it is hard to produce enough electricity. The structure of this generator is complicated, and it requires two hands to operate.

The reciprocated type or squeezing type allow single handed operation and yet the generator stops when hand motion stops. The generation of electricity is limited.

The hand actuated generator of the prior art operates by cranking or squeezing to drive the gears to rotate, those gears in turn drives the generator. Once cranking or squeezing stops, the generator also stops generating power. Accordingly, to generate more power, a great effort must be consumed. The applicant has also invented a hand crank generator which uses clutch gear and weighted wheel to achieve continuous generation of electricity current as in U.S. patent application Ser. No. 11/968,639. The shortcoming of that is it requires two hands to operate. This application is designed for single handed operation to overcome the above limitations.

SUMMARY OF THE INVENTION

The primary purpose of the present invention is to provide a hand squeeze generator that is simple in construction and allows single handed operation. When an external force disappears, the generator motor of the present invention continues to rotate for generation of electricity.

To achieve the purpose of the present invention, this hand squeeze generator comprises a carrying body, a lever, an elastic member to return the lever to its original position, a gear transmission unit, and a generator motor driven by the gear transmission unit. The lever drives the gear transmission unit and the gear transmission unit drives the generator motor through a clutch gear.

The elastic member is a spring having a central portion and two ends, the central portion of the elastic member and the lever is pivotally connected to a first shaft provided on the gear transmission unit, and one end of the elastic member hooks on the carrying body while the other end of the elastic member connects to the lever.

The clutch gear is inserted onto a deflection shaft and the deflection shaft has two ends located in a deflection groove. The deflection shaft could also be connected to the gear transmission unit through a connecting plate. The generator motor has a central shaft provided with a gear, the motor gear interacts with the clutch gear.

A weighted wheel is fixed to a terminal end of the central shaft of the generation motor.

The gear transmission unit comprises a first gear, a second double gear, a third double gear, and a fourth double gear, the first gear and the third double gear being inserted onto the first shaft, the second double gear and the fourth double gear being inserted onto a second shaft, the first gear meshing with a pinion of the second double gear, a gearwheel of the second double gear meshing with a pinion of the third double gear, a gearwheel of the third double gear meshing with a pinion of the fourth double gear, a gearwheel of the fourth double gear meshing with the clutch gear.

Alternatively, the gear transmission unit comprises a first gear and a second double gear, the first gear being inserted onto the first shaft, the second double gear being inserted onto a second shaft, the first gear meshing with a pinion of the second double gear, a gearwheel of the second double gear meshing with the clutch gear.

The lever is provided with an arc rack penetrating the carrying body, the arc rack driving the gear transmission unit.

Preferably, the lever has an upper end pivotally connected to the carrying body, the arc rack extending from a central portion of the lever and sliding along an arc track provided on an inner wall of the carrying body.

When the lever is pressed to drive the gear transmission unit, the clutch gear will drive the generator motor to rotate so that the generator motor is driven for generation of electricity. When the lever is released, the spring will push the lever to return to its original position and the arc rack will rotate in an opposite direction. The clutch gear disengages from the motor gear on the generator motor. The weighted wheel continues to revolve to generate electricity. This design saves strength, without pressing the lever continuously, and is convenient to operate with a single hand. The present invention is generally applied to a traffic baton or a flashlight.

The present invention may be installed on an electric appliance or connected to an electric appliance, alternatively, be used to charge a rechargeable battery. When the electric power is not enough or the battery is going to run down, it is not necessary to connect an external power source. The present invention generate electricity or to recharge a battery. The present invention is favorable for environmental protection, cost-effective, easy for production, and convenient in use.

DETAILED DESCRIPTION OF THE INVENTION

Figure 1:
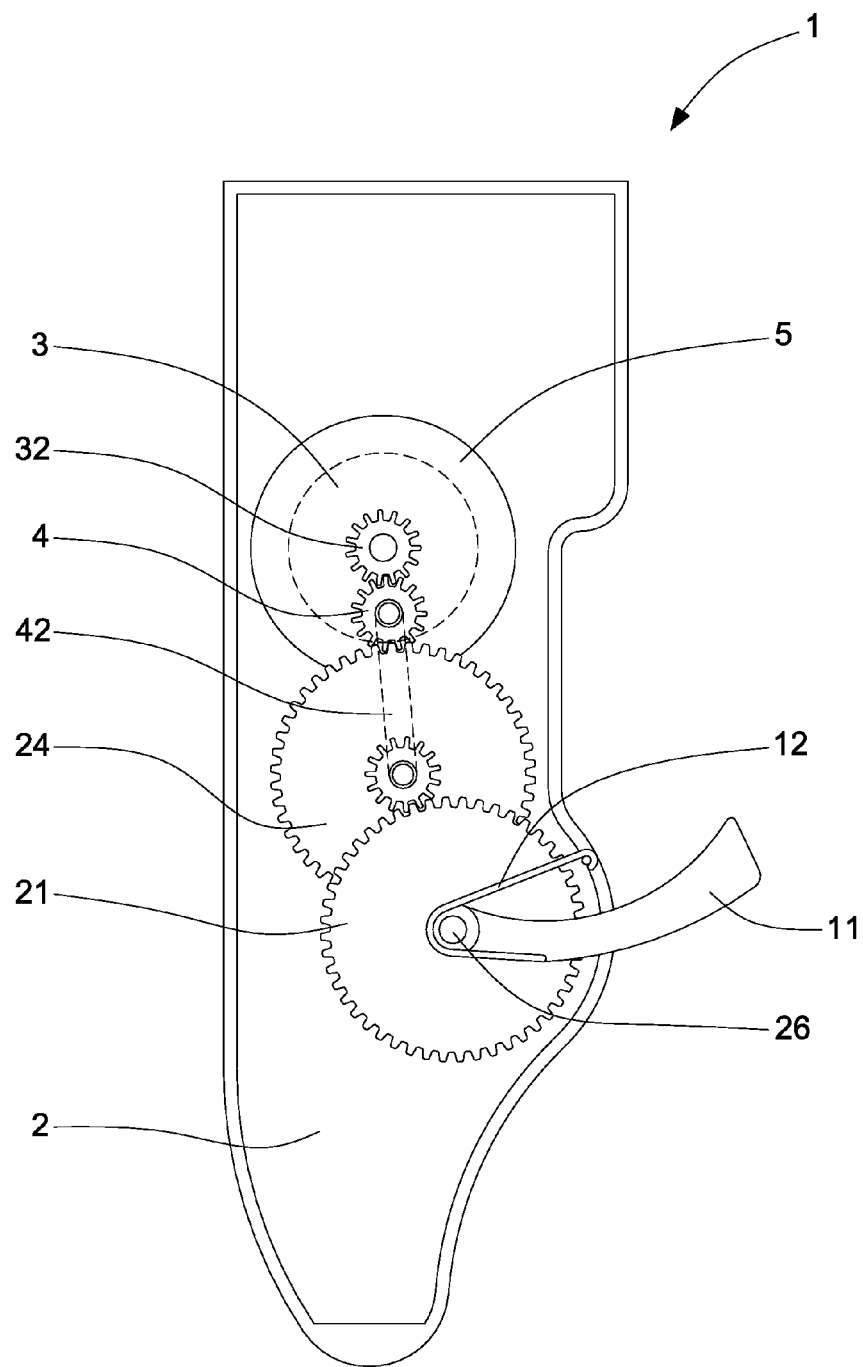
FIG. 1 is a top view of a first preferred embodiment of the present invention.
Figure 2:
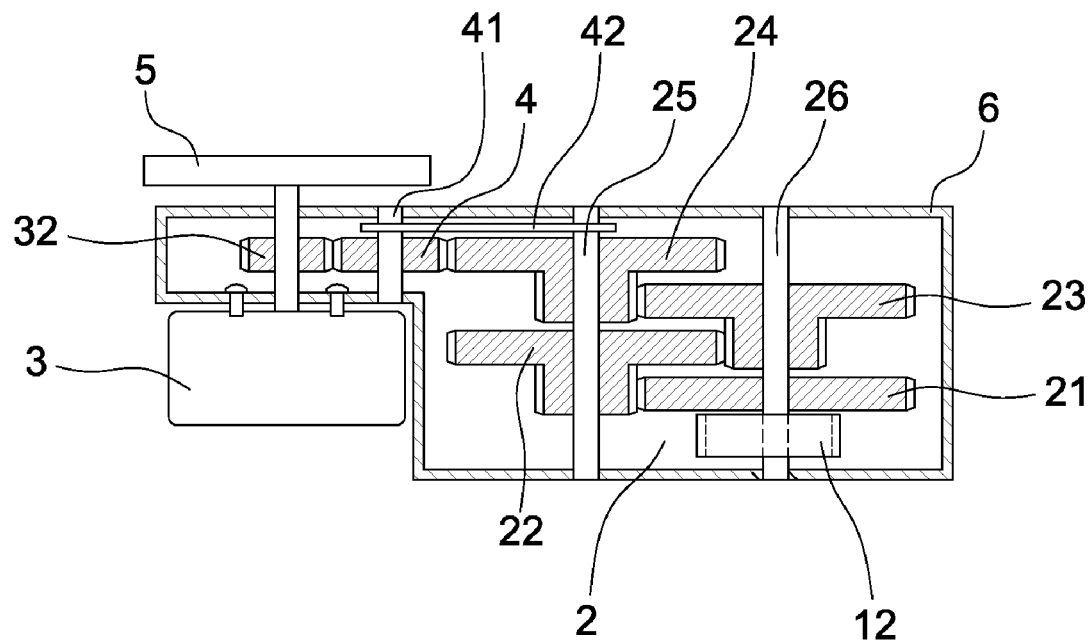
FIG. 2 is a schematic view showing an internal construction of the first preferred embodiment of the present invention.
Figure 3:
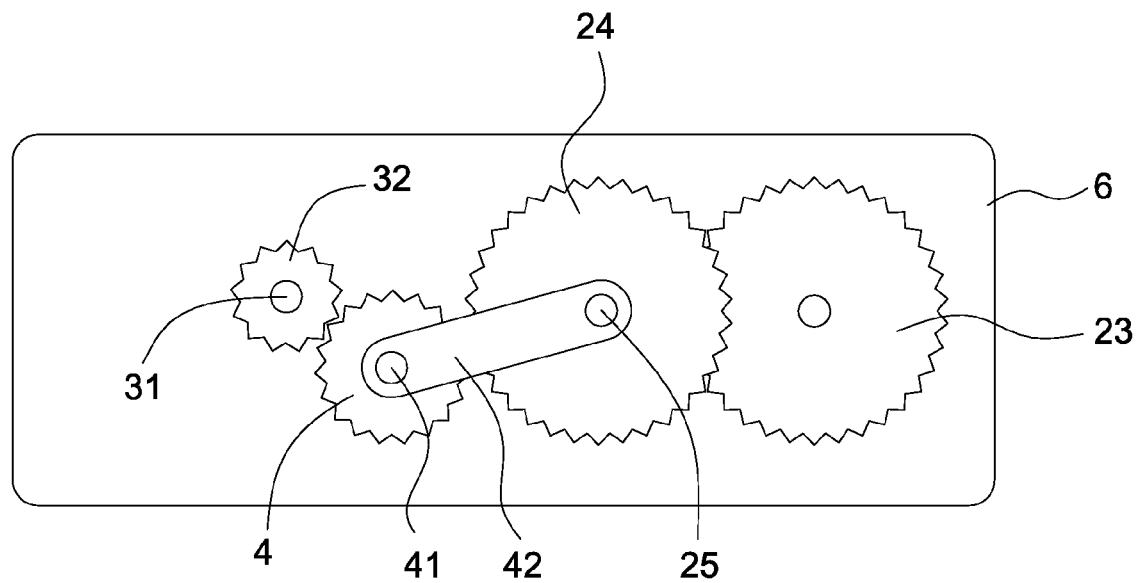
FIG. 3 is a schematic view showing a clutch gear meshing with a motor gear in the first preferred embodiment of the present invention.
Figure 4:
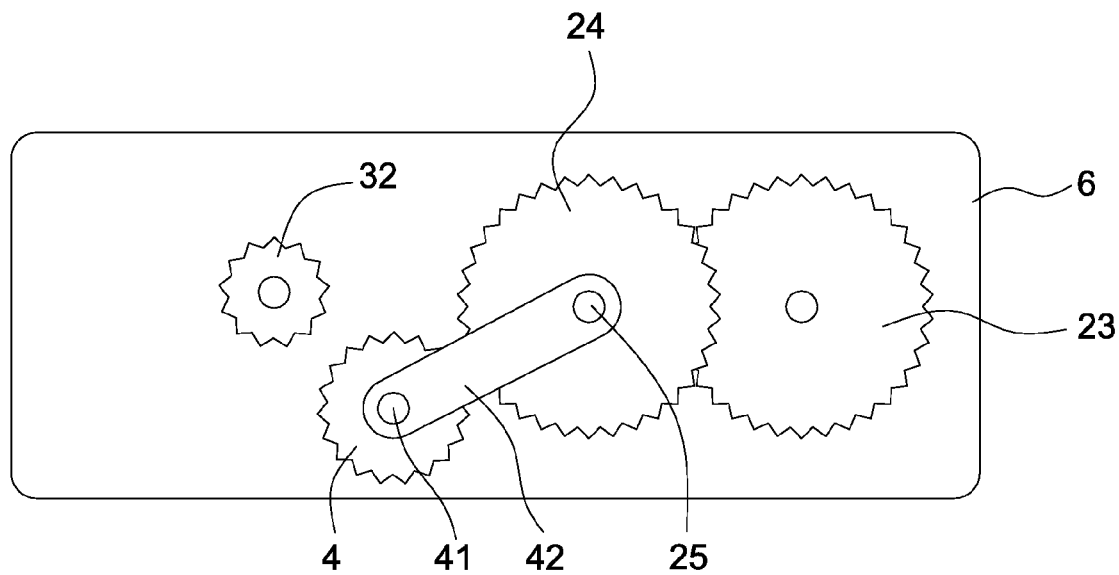
FIG. 4 is a schematic view showing the clutch gear disengaging from the motor gear in the first preferred embodiment of the present invention.
Figure 5:
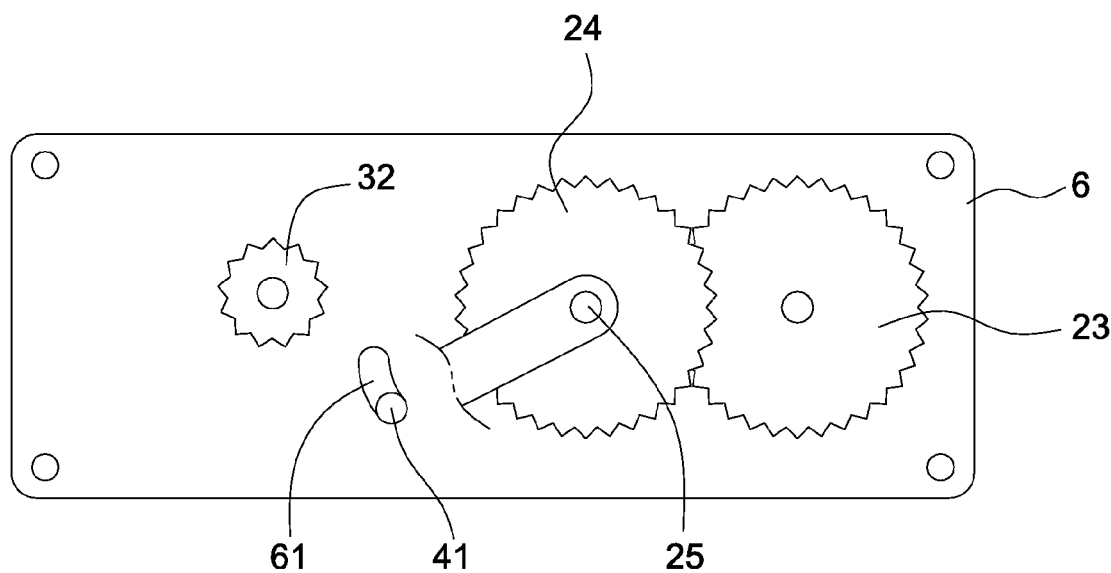
FIG. 5 is a schematic view showing a deflection groove of the clutch gear in the first preferred embodiment of the present invention.

As shown in FIGS. 1 through 5, a hand squeeze generator in accordance with a first preferred embodiment of the present invention comprises a carrying body 1, a lever 11, an elastic member 12 to return the lever 11 automatically, a gear transmission unit 2, a generator motor 3 driven by the gear transmission unit 2, a clutch gear 4, and a weighted wheel 5.

All the gear transmission unit 2, the generator motor 3, the clutch gear 4, and the weighted wheel 5 are mounted in the carrying body 1. The elastic member 12 is a spring having a central portion and two ends. The central portion of the elastic member 12 and the lever 11 are pivotally connected to a first shaft 26. One end of the elastic member 12 is connected to the carrying body 1, while the other end of the elastic member 12 connect to lever 11. The lever 11 connects to gear transmission unit 2 to drive the gear transmission. The clutch gear 4 is located at an output end of the gear transmission unit 2, and interacts with a motor gear 32 disposed on a central shaft 31 of the generator motor 3 to drive the generator motor 3 for generation of electricity.

The first gear 21 of the gear transmission unit 2 is a single gear. The lever 11 to drive the gear transmission. The elastic member 12 is adapted to return the lever 11 to its original position, act as a spring. One end of the spring connects to the carrying body 1 and the other end connects to the lever 11.

The gear transmission unit 2 comprises a first gear 21, a second double gear 22, a third double gear 23, and a fourth double gear 24. The first gear 21 and the third double gear 23 are inserted onto the first shaft 26. The second double gear 22 and the fourth double gear 24 are inserted onto a second shaft 25. Both the first shaft 26 and the second shaft 25 are secured in place by locating holes of a box 6. The first gear 21 meshes with a pinion of the second double gear 22. A gearwheel of the second double gear 22 meshes with a pinion of the third double gear 23. A gearwheel of the third double gear 23 meshes with a pinion of the fourth double gear 24. The input speed of the lever 11 is increased through the series transmission executed by the gear transmission unit 2. Finally, a gearwheel of the fourth double gear 24 meshes with the clutch gear 4 to further increase the rotational speed. Accordingly, the generator motor 3 is driven to enhance rotational speed so as to increase efficiency for generation of electricity.

The installation of the clutch gear 4 constitutes the most important feature of the present invention. When an external force is applied to drive the lever 11 to drive the gear transmission unit 2, the clutch gear 4 engages with the motor gear 32 of the generator motor 3 to generate electricity. When the external force is not applied to the lever 11, the central shaft 31 of the generator motor 3 continues to revolve due to inertia action from the weighted wheel and push the clutch gear 4 away and disengages from motor gear 32. Therefore the generator motor 3 continues to operate to generate electricity even when the lever 11 stops operating.

The clutch gear 4 is inserted onto a deflection shaft 41. The clutch gear 4 meshes with the gearwheel of the fourth double gear 24. The clutch gear 4 is rotated around the fourth double gear 24 to form a planet gear. Furthermore, the connecting plate 42 could be used to hold the clutch gear 4 firm in position to prevent its axial angle from deflection. To limit the deflection angle of the clutch gear 4, both ends of the deflection shaft 41 are disposed in a deflection groove 61. When an arc rack 13 of the lever 11 drives the gear transmission unit 2, the fourth double gear 24 will rotate to drive the clutch gear 4 to revolve. The clutch gear 4 is not in a fixed state, the fourth double gear 24 links the clutch gear 4 to engage motor gear 32 so that the generator motor 3 is connected to rotate. When the external force is not applied to the lever 11 anymore, the fourth double gear 24 will stop rotating and the inertia action from weighted wheel will push clutch 4 to disengage from gear 32 and the motor gear 32 continues to rotate for a certain time.

The weighted wheel 5 is fixed to a terminal end of the central shaft 31 of the generator motor 3 to increase inertia rotation of the generator motor 3. The weighted wheel 5 rotates at the same time when the arc rack 13 of the lever 11 drives the generator motor 3 for generation of electricity. The weighted wheel 5 is given with a relatively greater mass, it produces greater inertia. Therefore, once the central shaft 31 is disengaged from gear transmission 2, it continues to rotate for a longer time as driven by the weighted wheel 5 to provide continuous generation of electricity.

Figure 6:
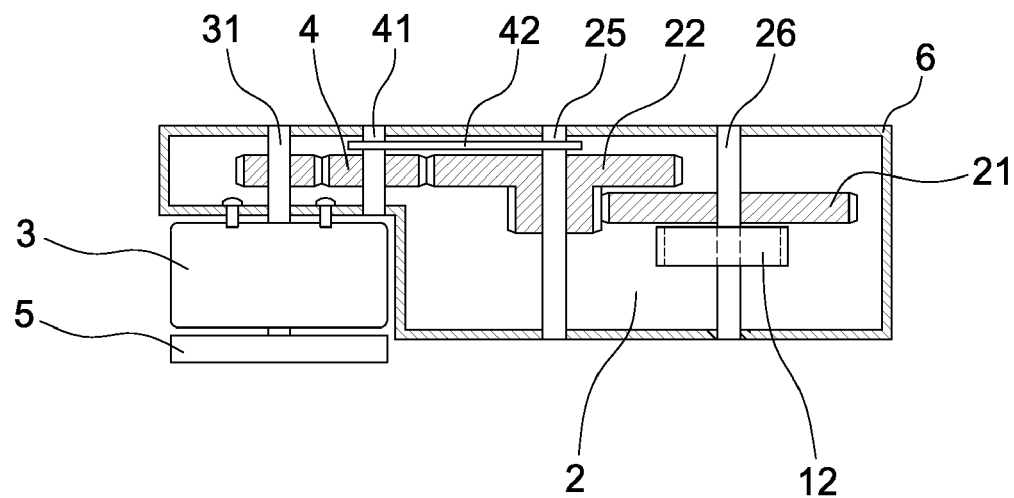
FIG. 6 is a schematic view of a second preferred embodiment of the present invention.

FIG. 6 shows a second preferred embodiment of the present invention. The gear transmission unit 2 comprises the first gear 21 and the second double gear 22. The first gear 21 is inserted onto the first shaft 26. The second double gear 22 is inserted onto the second shaft 25. The first gear 21 and the lever 11 are fixed on the first shaft 26. The first gear 21 meshes with the pinion of the second double gear 22. The gearwheel of the second double gear 22 meshes with the clutch gear 4. In this embodiment, the gear transmission unit 2 delivers a regular acceleration. Furthermore, the weighted wheel 5 is located alongside with the generator motor 3. This embodiment is provided with a wire to charge, and is substantially similar to the aforesaid first embodiment. Therefore, it is not described hereinafter.

Figure 7:
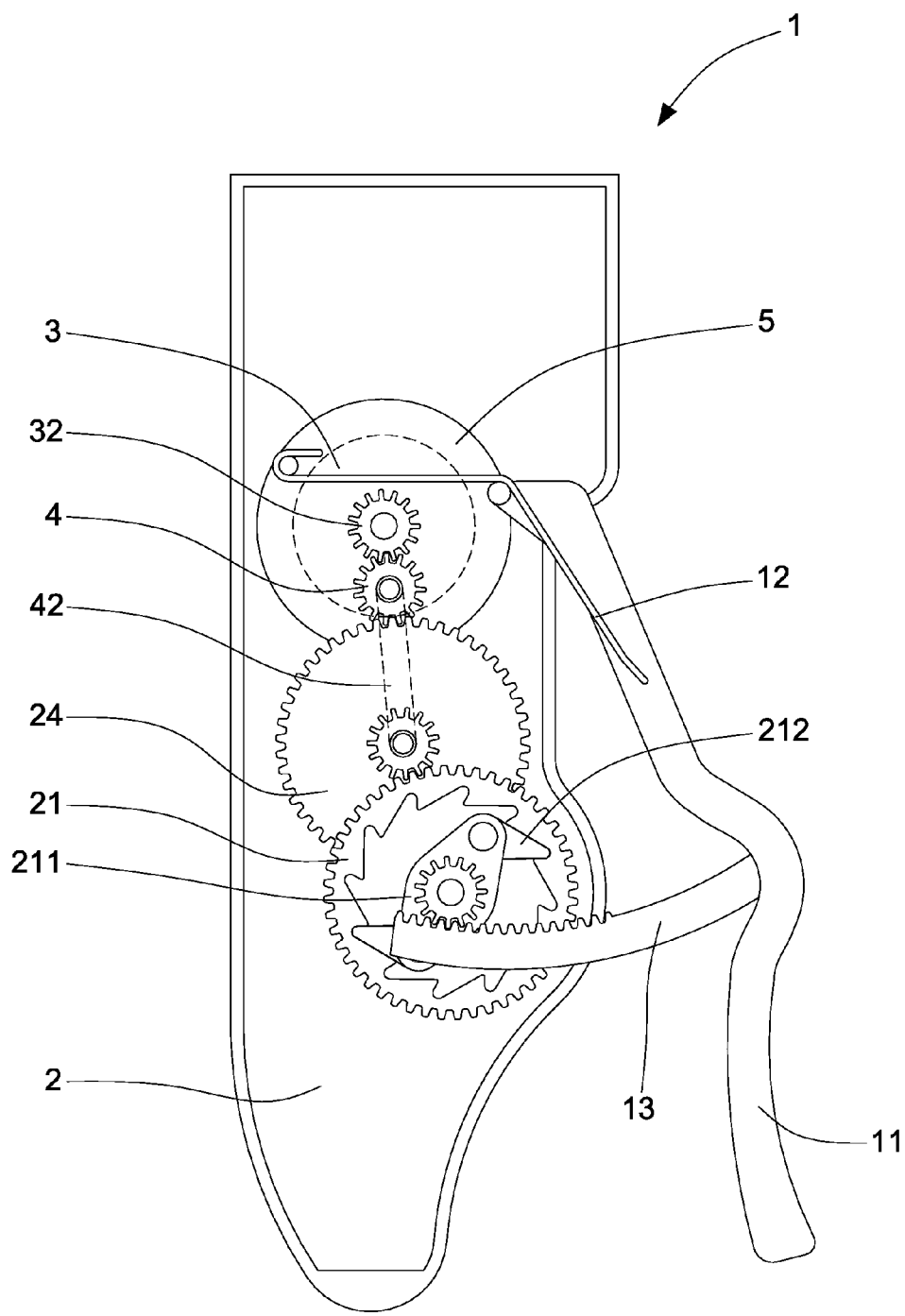
FIG. 7 is a schematic view showing a one-way gear in the second preferred embodiment of the present invention.
Figure 8:
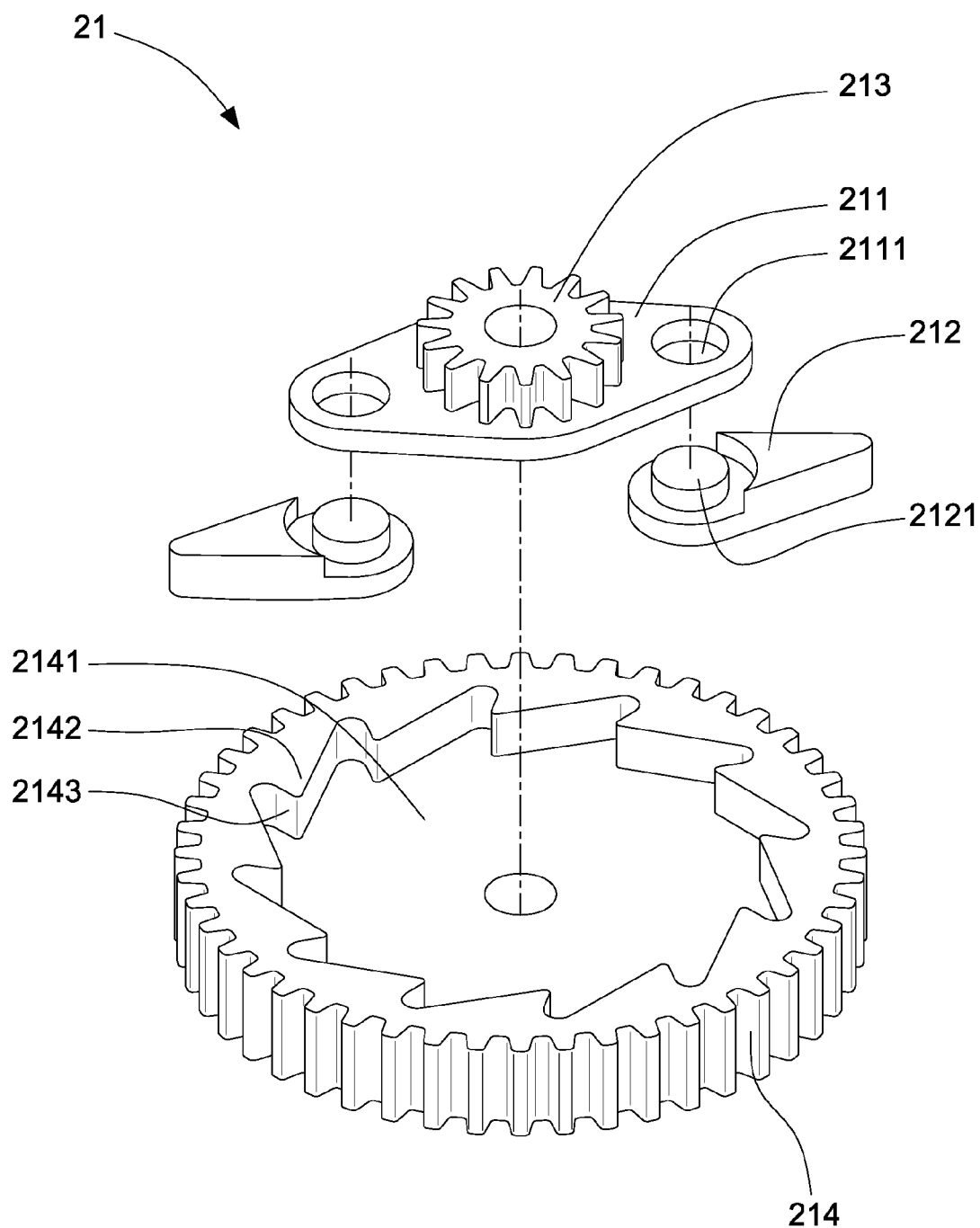
FIG. 8 is an exploded view of a third preferred embodiment of the present invention.

FIGS. 7 and 8 show a third preferred embodiment of the present invention. In this embodiment, the lever 11 is a V-shaped handle. The lever 11 has an upper end pivotally connected to the carrying body 1 and an arc rack 13 at a center portion thereof to slide along an arc track provided on an inner wall of the carrying body 1. The arc rack 13 of the lever 11 meshes with a pinion of the first gear 21 to drive the pinion of the first gear 21 directly. The lever 11 directly drives the first gear 21 for reciprocation.

When the lever 11 is pressed to drive the arc rack 13, the arc rack 13 will link the gear transmission unit 2, the clutch gear 4 and the generator motor 3 will rotate to generate electricity. When the lever 11 is released, the spring 12 will push the lever 11 to return to its original position and the arc rack 13 will rotate in an opposite direction. The clutch gear 4 disengages from the motor gear 32 on the generator motor 3. The weighted wheel 5 continues to revolve for generation of electricity. This design saves strength, without pressing the lever 11 continuously.

The clutch gear 4 is adapted to control the connection of the generation motor 3 and the gear transmission unit 2 so that the generation motor 3 is unable to rotate in an opposite direction. This function also can be achieved by a one-way gear. As shown in FIGS. 7 and 8, either of the clutch gear 4 and the one-way gear 21 is able to achieve the same function.

The one-way gear 21 comprises a diamond base 211, a pinion 213 coupled to the diamond base 211, a pair of drop-shaped blocks 212 and a gearwheel 214. The diamond base 211 has a pair of through holes 2111. Each of the drop-shaped blocks 212 has a protruding button 2121. The protruding button 2121 is inserted into the through hole 2111 to provide swing function. The gearwheel 214 has a one-way tooth trough 2141. A plurality of slant teeth 2142 are formed on an inner wall of the gearwheel 214. Each of the slant teeth 2142 has a vertical surface 2143. The protruding button 2121 of the drop-shaped block 212 is stopped by the vertical surface 2143 so that the gearwheel 214 provides a one-way function.

When the pinion 213 is rotated clockwise, the diamond base 211 will drive the pair of drop-shaped blocks 212. The protruding buttons 2121 of the drop-shaped blocks 212 are located in the one-way tooth trough 2141 and confined by the vertical surface 2143 so that the gearwheel 214 is rotated clockwise. When the opinion 213 is rotated anti-clockwise, the diamond base 211 will drive the pair of drop-shaped blocks 212 to rotate in an opposite direction. The protruding buttons 2121 of the drop-shaped blocks 212 slide along the slant teeth 2142, which are not confined by the vertical surface 2143 so that the gearwheel 214 cannot be forced to rotate anti-clockwise and the diamond base 211 with the pinion 213 being idling.

The present invention could generate electricity and charge other appliances. When the lever is pressed to drive the gear transmission unit, the clutch gear will drive the generator motor to rotate so that the generator motor is driven for generation of electricity. When the lever is released, the spring will push the crank to return to its original position and the arc rack will rotate in an opposite direction. The clutch gear disengages from the motor gear on the generator motor. The weighted wheel continues to revolve for generation of electricity. This design saves strength, without pressing the lever continuously, and is convenient to operate with a single hand. The present invention is generally applied to a traffic baton or a flashlight.

The present invention may be installed on an electric appliance or connected to an electric appliance, alternatively, be used to charge a rechargeable battery. When the electric power is not enough or the battery is going to run down, it is not necessary to connect an external power source. The present invention is driven to generate electricity or to recharge a battery. The present invention is favorable for environmental protection, cost-effective, easy for production, and convenient in use.

Although the present invention has been shown and described with respect to the preferred embodiments, it will be understood by those skilled in the art that various changes and modifications may be made without departing from the spirit and scope of the invention as defined in the following claims.

What is claimed is:

1. A hand squeeze generator, comprising a carrying body, a lever, an elastic member to return the lever to the original position thereof, a gear transmission unit, and a generator motor driven by the gear transmission unit, wherein the lever drives the gear transmission unit and the gear transmission unit drives the generator motor through a clutch gear.

2. The hand squeeze generator as claimed in claim 1, wherein the elastic member is a spring having two ends, the central portion of the elastic member is inside of a carrying body and the lever, and one end of the elastic member connects to the carrying body while the other end of the elastic member connects to the lever.

3. The hand squeeze generator as claimed in claim 1, wherein the clutch gear is inserted onto a deflection shaft, the deflection shaft having two ends located in a deflection groove to keep track of a deflection angle of the clutch gear, and the deflection shaft could also connect to a gear of the gear transmission unit through a connecting plate.

4. The hand squeeze generator as claimed in claim 3, wherein the generator motor has a central shaft provided with a motor gear, and the motor gear interacts with the clutch gear.

5. The hand squeeze generator as claimed in claim 4, wherein a weighted wheel is fixed to a terminal end of the central shaft of the generator motor.

6. The hand squeeze generator as claimed in claim 4, wherein the gear transmission is comprised of a plurality of gears; a first gear is inserted to a shaft and is connected to the lever and engages with a pinion of the second gear; a second gear engages next gear to form a gear transmission; and a gearwheel of last gear meshs with the clutch gear.

7. The hand squeeze generator as claimed in claim 4, wherein the gear transmission unit comprises a first gear and a second double gear, the first gear being inserted onto the first shaft, the second double gear being inserted onto a second shaft, the first gear meshing with a pinion of the second double gear, a gearwheel of the second double gear meshing with the clutch gear.

8. The hand squeeze generator as claimed in claim 7, wherein the lever has an upper end pivotally connected to the carrying body, the arc rack extending from a central portion of the lever and sliding along an arc track provided on an inner wall of the carrying body.

9. The hand squeeze generator as claimed in claim 1, wherein the lever is provided with an arc rack penetrating the carrying body, the arc rack driving the gear transmission unit.

* * * * *